United States Patent
Sakurai et al.

(10) Patent No.: US 10,838,531 B2
(45) Date of Patent: Nov. 17, 2020

(54) TOUCHSCREEN PANEL

(71) Applicant: FUJITSU COMPONENT LIMITED, Tokyo (JP)

(72) Inventors: Satoshi Sakurai, Tokyo (JP); Yutaka Ueno, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 14 days.

(21) Appl. No.: 16/251,610

(22) Filed: Jan. 18, 2019

(65) Prior Publication Data

US 2019/0258347 A1 Aug. 22, 2019

(30) Foreign Application Priority Data

Feb. 16, 2018 (JP) .................... 2018-025670

(51) Int. Cl.
G06F 3/041 (2006.01)

(52) U.S. Cl.
CPC ............ *G06F 3/0412* (2013.01); *G06F 3/041* (2013.01); *G06F 3/0416* (2013.01)

(58) Field of Classification Search
None
See application file for complete search history.

(56) References Cited

U.S. PATENT DOCUMENTS

| | | | | |
|---|---|---|---|---|
| 2007/0181456 A1* | 8/2007 | Kusuda | ................. | G06F 1/1626 206/443 |
| 2009/0086114 A1* | 4/2009 | Higuchi | ............. | G02F 1/13338 349/12 |
| 2011/0205183 A1 | 8/2011 | Sugihara | | |
| 2011/0285640 A1* | 11/2011 | Park | ..................... | G02F 1/13338 345/173 |
| 2012/0044176 A1* | 2/2012 | Nakamura | ............ | G06F 3/0412 345/173 |
| 2014/0043244 A1* | 2/2014 | van Lieshout | ........ | G06F 1/1643 345/173 |
| 2015/0002936 A1* | 1/2015 | Jun | ........................ | G06F 1/1603 359/492.01 |
| 2015/0097802 A1* | 4/2015 | Kim | ........................ | G06F 3/044 345/174 |
| 2015/0160760 A1 | 6/2015 | Sato | | |
| 2016/0357079 A1* | 12/2016 | Chen | ................. | G02F 1/136204 |
| 2017/0077696 A1* | 3/2017 | Demenschonok | ........ | G06F 3/02 |
| 2020/0026123 A1* | 1/2020 | Fujita | ................ | G02F 1/133528 |

FOREIGN PATENT DOCUMENTS

| | | |
|---|---|---|
| EP | 2244172 | 10/2010 |
| EP | 2584437 | 4/2013 |
| JP | 2012-181781 | 9/2012 |
| JP | 2015-125471 | 7/2015 |

\* cited by examiner

*Primary Examiner* — Dorothy Harris
(74) *Attorney, Agent, or Firm* — IPUSA, PLLC (57) ABSTRACT

A touchscreen panel includes a main body including a lower substrate that includes a first transparent conductive film, and an upper sheet that includes a second transparent conductive film, a static-removing film, arranged on the main body, and including a conductive film, and a lead including a conductive part electrically connected to the conductive film. The main body includes a cutout in which the lead is arranged.

11 Claims, 13 Drawing Sheets

TOUCHSCREEN PANEL

CROSS-REFERENCE TO RELATED APPLICATIONS

This application is based upon and claims priority to Japanese Patent Application No. 2018-025670 filed on Feb. 16, 2018, the entire contents of which are incorporated herein by reference.

BACKGROUND OF THE INVENTION

1. Field of the Invention

The embodiments discussed herein are related to a touchscreen panel.

2. Description of the Related Art

Touchscreen panels that can prevent an erroneous operation by removing electrostatics are proposed in Japanese Laid-Open Patent Publication No. 2012-181781 and Japanese Laid-Open Patent Publication No. 2015-125471 (now Japanese Patent No. 6246584), for example. According to these proposals, a conductive film for removing the electrostatic is provided on the touchscreen panel, to remove built-up electrostatic of an operator when the operator touches the touchscreen panel.

On the other hand, touchscreen panels having a flush-surface design are proposed, as touchscreen panels having appealing design. According to the flush-surface design, a frame of a casing and an operation screen of the touchscreen panel form a flush surface and no stepped part or a difference in surface levels exist between the frame and the operation screen.

However, according to a structure proposed in Japanese Laid-Open Patent Publication No. 2012-181781, a conductive film forming a static-removing film is electrically connected to the frame at an outer peripheral side on an upper surface of the static-removing film. For this reason, the frame and the operation screen cannot form a flush surface such that no stepped part or a difference in surface levels exist between the casing and the operation screen of the touchscreen panel. On the other hand, according to a structure proposed in Japanese Laid-Open Patent Publication No. 2015-125471 (now Japanese Patent No. 6246584), a static-removing FPC (Flexible Printed Circuit) is arranged on the upper surface of the static-removing film formed by the conductive film. Consequently, the frame and the operation screen cannot form the flush surface such that no stepped part or the difference in surface levels exist between the casing and the operation screen.

SUMMARY OF THE INVENTION

Accordingly, it is an object in one aspect of the embodiments to provide a touchscreen panel having a function to remove electrostatics, and a flush surface such that no stepped part or a difference in surface levels exist between a casing and an operation screen of the touchscreen panel.

According to one aspect of embodiments of the present invention, a touchscreen panel includes a main body including a lower substrate that includes a first transparent conductive film, and an upper sheet that includes a second transparent conductive film; a static-removing film, arranged on the main body, and including a conductive film; and a lead including a conductive part electrically connected to the conductive film, wherein the main body includes a cutout in which the lead is arranged.

Other objects and further features of the present invention will be apparent from the following detailed description when read in conjunction with the accompanying drawings.

DESCRIPTION OF THE PREFERRED EMBODIMENTS

Embodiments of a touchscreen panel according to the present invention will be described, by referring to the drawings.

Figure 1:
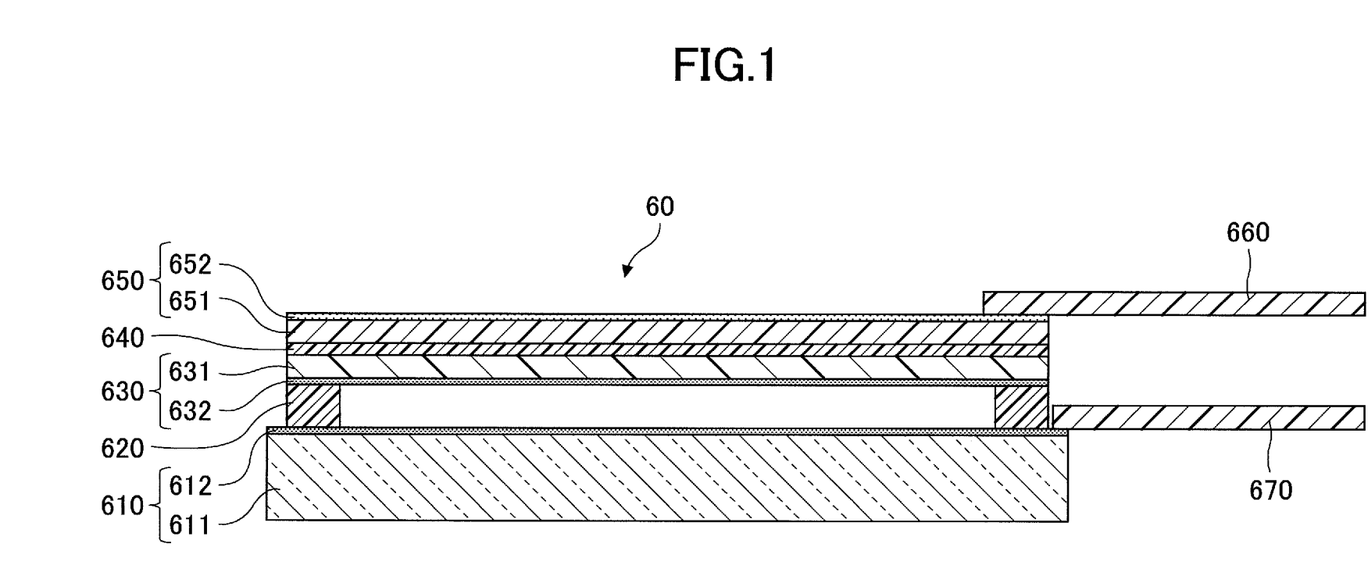
FIG. 1 is a cross sectional view illustrating a first example of a touchscreen panel.
Figure 2:
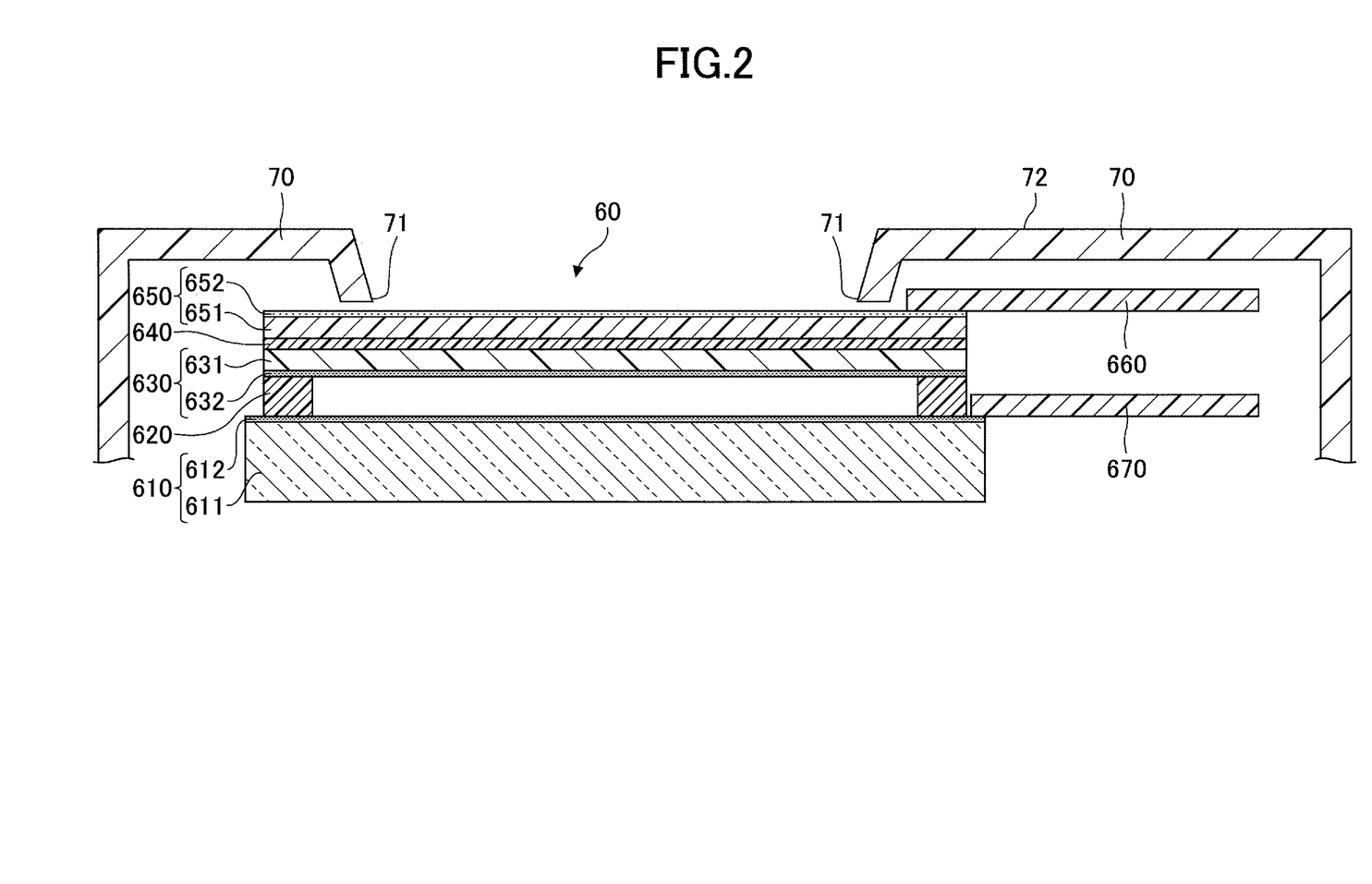
FIG. 2 is a cross sectional view illustrating the first example of the touchscreen panel accommodated within a casing.

A first example of the structure of the touchscreen panel will be described, by referring to FIG. 1 and FIG. 2. FIG. 1 is a cross sectional view illustrating the first example of a touchscreen panel 60. FIG. 2 is a cross sectional view illustrating the touchscreen panel 60 accommodated within a casing 70. In the following description, a direction perpendicular to an operation screen of the touchscreen panel is referred to as an up-and-down direction, the side on the operation screen of the touchscreen panel is referred to as an upper side, and the side on a back surface of the touchscreen panel, opposite to the operation screen, is referred to as a lower side. The above direction and sides are similarly referred to in FIG. 2 through FIG. 14 which will be described later.

As illustrated in FIG. 1, the touchscreen panel 60 includes a lower substrate 610, an upper sheet 630, a static-removing film 650, an FPC 660 for static removal, and an FPC 670 for position detection. The lower substrate 610 includes a glass substrate 611, and an ITO (Indium Tin Oxide) film 612 formed on an upper surface of the substrate 611. The upper sheet 630 includes a PET (Poly-Ethylene Terephthalate) film 631, and an ITO film 632 formed on a lower surface of the film 631. The static-removing film 650 includes a PET film 651, and a conductive film 652 formed on an upper surface of the film 651.

One end of the FPC 660 is fixed to an outer peripheral on an upper surface of the static-removing film 650, and the FPC 660 extends outward in a horizontal direction from the outer peripheral of the static-removing film 650. In addition, a terminal on the one end of the FPC 660 is electrically connected to the conductive film 652, and a terminal on the other end of the FPC 660 is electrically connected to ground (that is, grounded).

One end of the FPC 670 is fixed to an outer peripheral on the upper surface of the substrate 611, and the FPC 670 extends outward in the horizontal direction from the outer peripheral of the substrate 611. Further, although illustration is omitted, the FPC 670 includes a plurality of independent wiring patterns, and terminals of the FPC 670 respectively are electrically connected to an electrode formed on the ITO film 612 and an electrode formed in the ITO film 633. The electrode formed on the ITO film 612 and the terminal formed on the FPC 670 are electrically connected via a wiring pattern formed on the substrate 611. The electrode formed on the ITO film 632 and the terminal formed on the FPC 670 are electrically connected via a wiring pattern formed on the film 631, the wiring pattern formed on the substrate 611, and a conductive material electrically connecting the wiring pattern on the film 631 and the wiring pattern on the substrate 611.

As illustrated in FIG. 2, a casing 70 that accommodates the touchscreen panel 60, is provided with an opening 71 so that the outer peripheral on the upper surface of the touchscreen panel 60 is concealed by the casing 70. The opening 71 has a rectangular shape in a plan view. Hence, when the touchscreen panel 60 is viewed from the side of the operation screen, it is possible to conceal an adhesive layer 620, electrodes and wiring patterns provided on the upper sheet 630 and the lower substrate 610, the FPCs 660 and 670, or the like. However, in the example illustrated in FIG. 2, because the FPC 660 is arranged so that the FPC 660 is not visible through the opening 71, a stepped part or a difference in surface levels exists between the operation screen of the touchscreen panel 60 and a top surface 72 of the casing 70.

Figure 3:
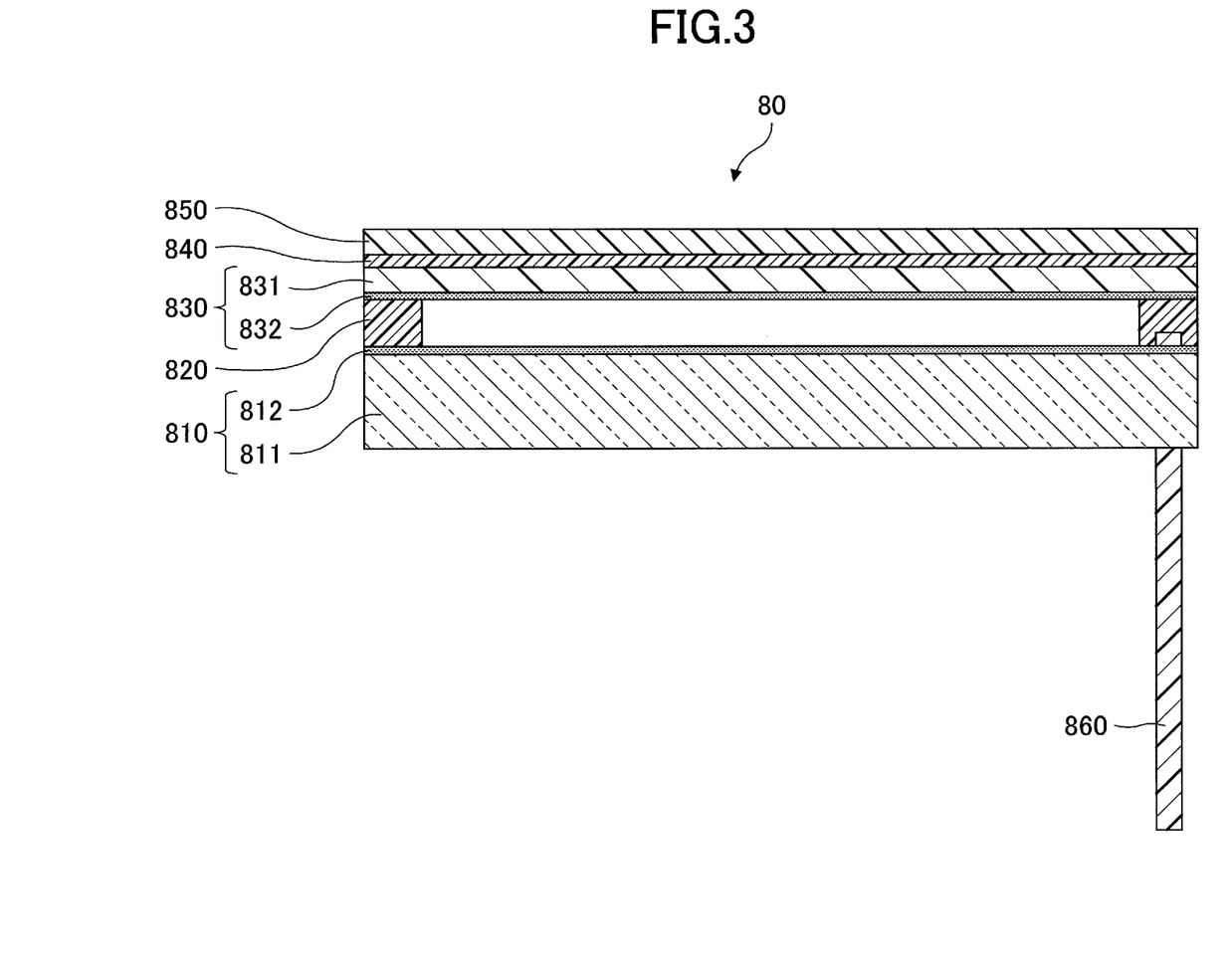
FIG. 3 is a cross sectional view illustrating a second example of the touchscreen panel.
Figure 4:
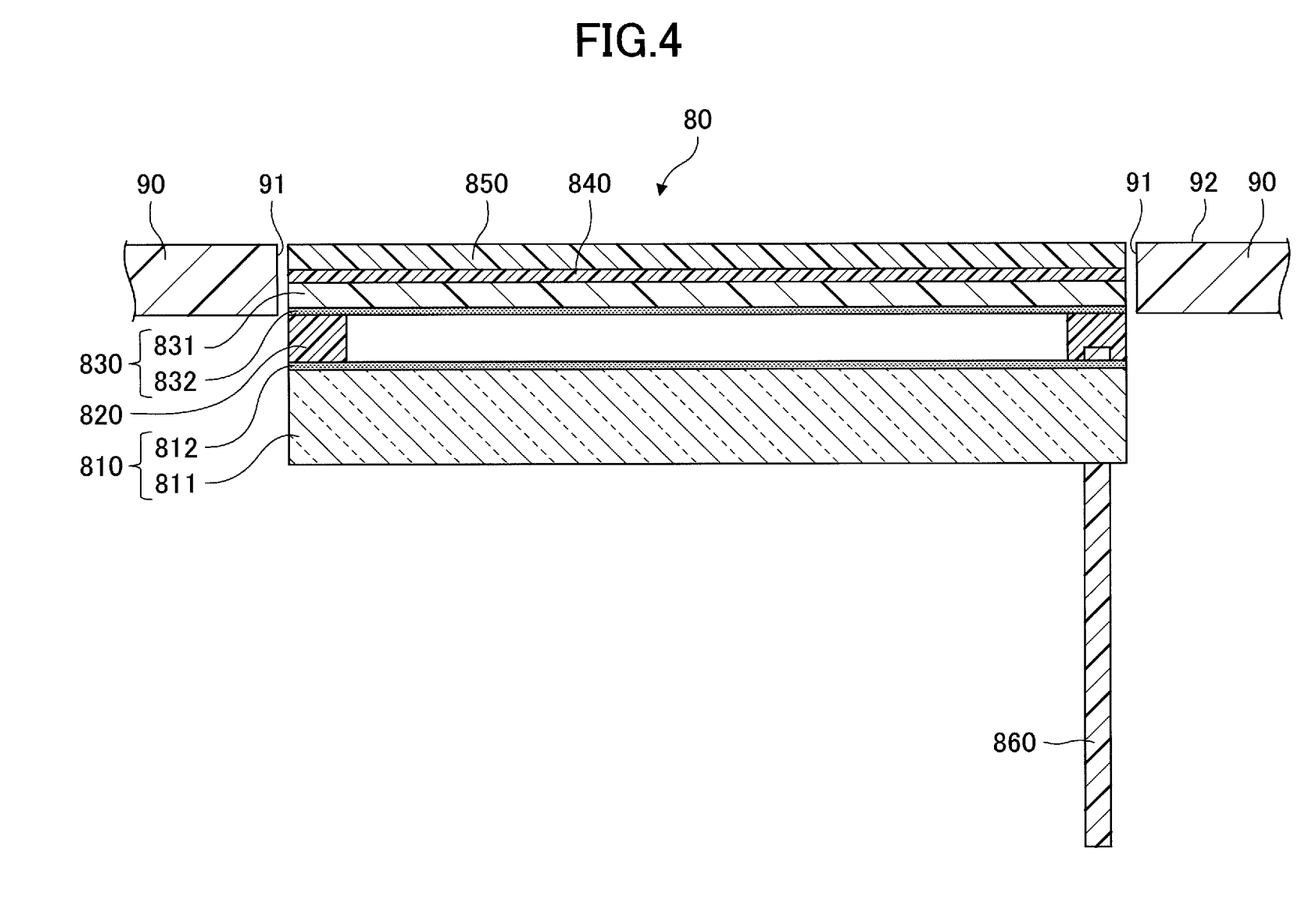
FIG. 4 is a cross sectional view illustrating the second example of the touchscreen panel accommodated within the casing.

Next, a second example of the touchscreen panel will be described, by referring to FIG. 3 and FIG. 4. FIG. 3 is a cross sectional view illustrating the second example of a touchscreen panel 80. FIG. 4 is a cross sectional view illustrating the touchscreen panel 80 accommodated within a casing 90.

As illustrated in FIG. 3, the touchscreen panel 80 includes a lower substrate 810, an upper sheet 830, a decoration film 850, and an FPC 860. The lower substrate 810 includes a glass substrate 811, and an ITO film 812 formed on an upper surface of the substrate 811. The upper sheet 830 includes a PET film 831, and an ITO film 832 formed on a lower surface of the film 831.

An elongated hole that penetrates the substrate 811 from the upper surface to a lower surface thereof, is formed in the substrate 811 on the right side in FIG. 3. One end of the FPC 860 is fixed to an outer peripheral on the upper surface of the substrate 811, and the FPC 860 extends outward in the horizontal direction from the outer peripheral of the substrate 811 through the elongated hole. Further, although illustration is omitted, the FPC 860 includes a plurality of wiring patterns, and terminals of the FPC 860 respectively are electrically connected to an electrode formed on the ITO film 812 and an electrode formed in the ITO film 832. The electrode formed on the ITO film 812 and the terminal formed on the FPC 860 are electrically connected via a wiring pattern formed on the substrate 811. The electrode formed on the ITO film 832 and the terminal formed on the FPC 860 are electrically connected via a wiring pattern formed on the film 831, the wiring pattern formed on the substrate 811, and a conductive material electrically connecting the wiring pattern on the film 831 and the wiring pattern on the substrate 811.

The casing 90 that accommodates the touchscreen panel 80 is provided with an opening 91 having a rectangular shape in a plan view. As illustrated in FIG. 4, the touchscreen panel 80 is arranged to fit into the opening 91. Hence, no stepped part or a difference in surface levels exists between the operation screen of the touchscreen panel 80 and a top surface 92 of the casing 90, to form a flush surface.

The decoration film 850 includes a decoration part that is printed with a decoration, and a transparent part having no decoration. The decoration part is provided in a shape of a frame on an outer peripheral of the decoration film 850 so as to surround the transparent part. The decoration part conceals an adhesive layer 820, electrodes and wiring patterns provided on the upper sheet 830 and the lower substrate 810, the FPC 860, or the like.

Touchscreen Panel in One Embodiment

Figure 5:
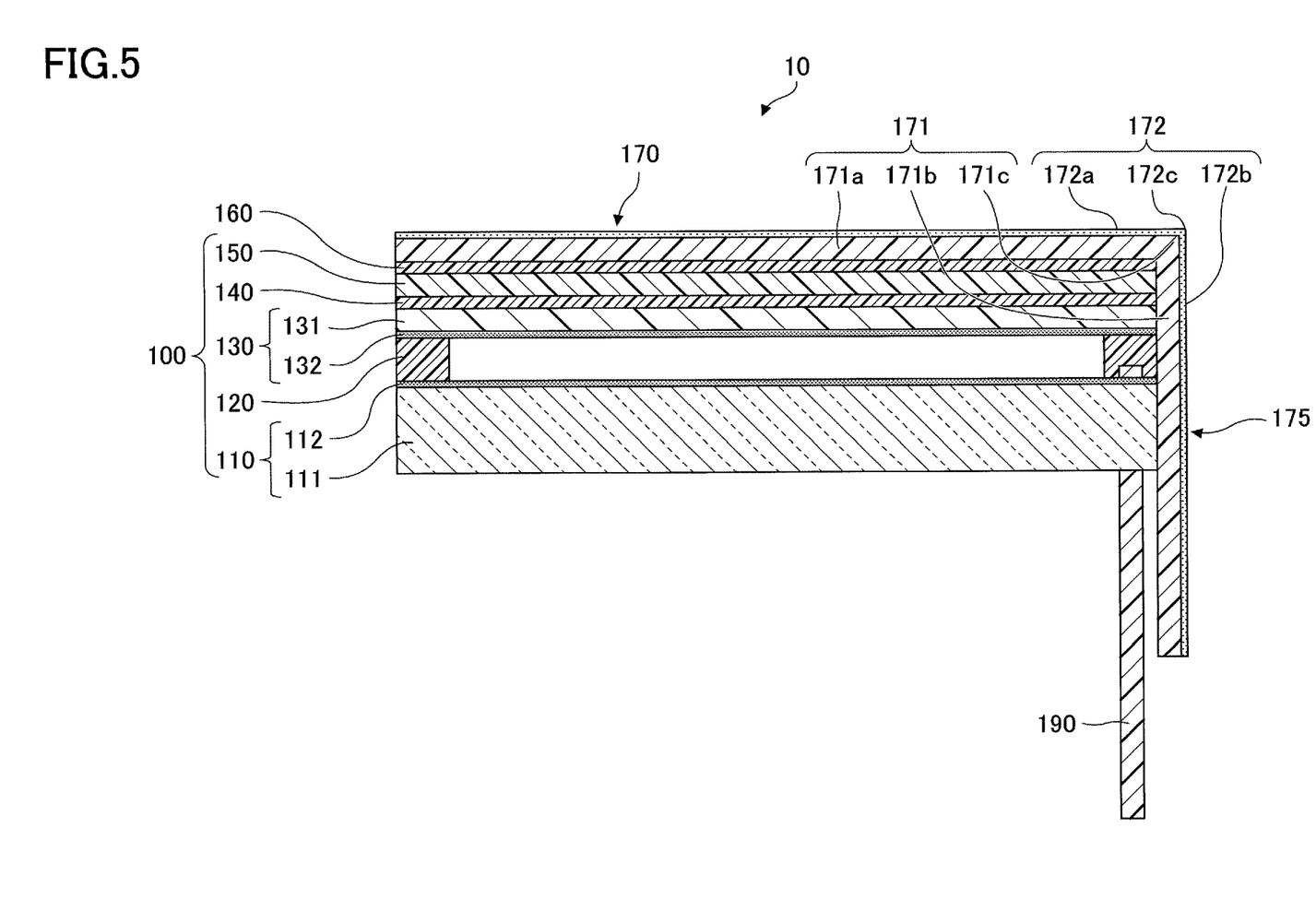
FIG. 5 is a cross sectional view illustrating a touchscreen panel in one embodiment.
Figure 6:
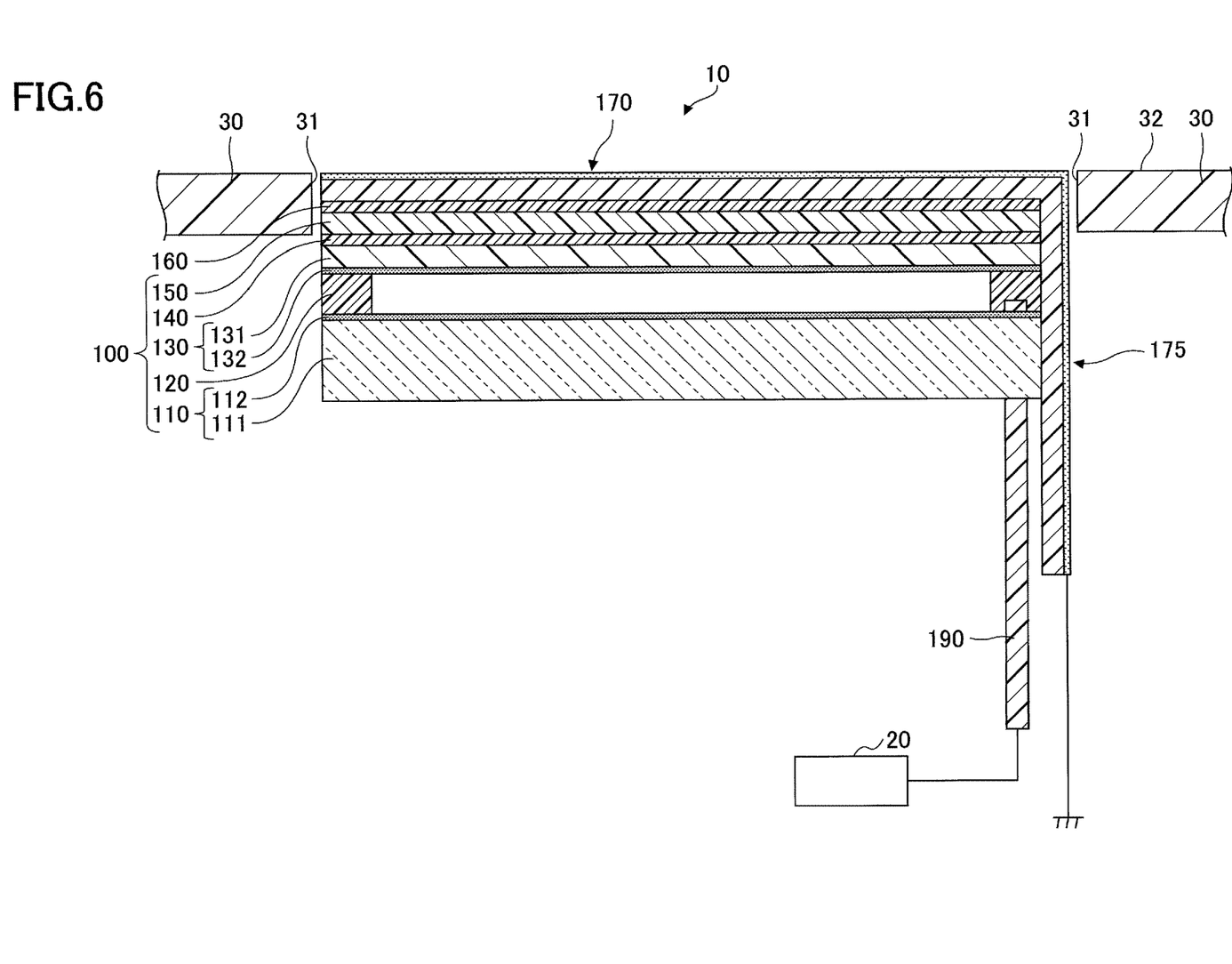
FIG. 6 is a cross sectional view illustrating the touchscreen panel in one embodiment accommodated within a casing.

A touchscreen panel 10 in one embodiment will be described, by referring to FIG. 5 and FIG. 6. FIG. 5 is a cross sectional view of the touchscreen panel 10. FIG. 6 is a cross sectional view of the touchscreen panel 10 accommodated within a casing 30.

As illustrated in FIG. 5, the touchscreen panel 10 includes a lower substrate 110, an upper sheet 130, a decoration film 150, a static-removing film 170, a lead 175 for static removal, and an FPC 190 for coordinate detection. The lower substrate 110 includes a glass substrate 111, and an ITO film 112 formed on an upper surface of the substrate 111. The upper sheet 130 includes a PET film 131, and an ITO film 132 formed on a lower surface of the film 131. The static-removing film 170 includes a PET film 171, and a conductive film 172 formed on an upper surface of the film 171. In this embodiment, a stacked structure including the lower substrate 110 up to the decoration film 150 is referred to as a main body 100.

In the lower substrate 110, the ITO film 112, which is a transparent conductive film, is formed on the upper surface of the substrate 111, which is a base material. Although illustration is omitted, electrodes and wiring patterns for wiring the FPC 190 are printed at an outer peripheral on the upper surface of the lower substrate 110.

An adhesive layer 120 is formed in a frame shape on the upper surface of the lower substrate 110. The adhesive layer 120 fixes the upper sheet 130 on the lower substrate 110, and also functions as a spacer that separates the ITO film 132 and the ITO film 112 in a non-pressed state in which the touchscreen panel 10 is not pressed.

In the upper sheet 130, the ITO film 132, which is a transparent conductive film, is formed on the power surface of the film 131, which is a flexible base. Although illustration is omitted, electrodes and wiring patterns for wiring the FPC 190 are printed at an outer peripheral on a lower surface of the upper sheet 130.

Although illustration is omitted, an elongated hole, that penetrates the substrate 111 from the upper surface to a lower surface thereof, is formed in the substrate 111 on the right side in FIG. 5. One end of the FPC 190 is fixed to an outer peripheral on the upper surface of the substrate 111, and the FPC 190 extends outward in a vertical direction from the outer peripheral of the substrate 111 through the elongated hole. Further, although illustration is omitted, the FPC 190 includes a plurality of wiring patterns, and terminals of the FPC 190 respectively are electrically connected to an electrode formed on the ITO film 112 and an electrode formed in the ITO film 132. The electrode formed on the ITO film 112 and the terminal formed on the FPC 190 are electrically connected via a wiring pattern formed on the substrate 111. The electrode formed on the ITO film 132 and the terminal formed on the FPC 190 are electrically connected via a wiring pattern formed on the film 131, the wiring pattern formed on the substrate 111, and a conductive material electrically connecting the wiring pattern on the film 131 and the wiring pattern on the substrate 111. Terminals on the other end of the FPC 190 are electrically connected to a controller 20 illustrated in FIG. 6.

The touchscreen panel 10 is a resistive touchscreen panel. When an operator presses the touchscreen panel 10, the upper sheet 130 flexes at the pressed position, and the ITO film 112 and the ITO film 132 make contact and conduct at the pressed position. The controller 20 applies a voltage across predetermined electrodes, and detects voltages at other electrodes, to detect the pressed position. For example, in the case of a 4-wire resistive touchscreen panel, the electrodes are arranged on the ITO film 112 separated along a first direction, and the electrodes are arranged on the ITO film 132 separated along a second direction intersecting the first direction. The controller 20 applies a voltage across the electrodes formed on the ITO film 112, and detects a voltage across the electrodes of the upper sheet 130, to detect a coordinate along the first direction. In addition, the controller 20 applies a voltage across the electrodes formed on the ITO film 132, and detects a voltage across the electrodes of the lower substrate 110, to detect a coordinate along the second direction. Of course, the touchscreen panel 10 is not limited to the 4-wire resistive touchscreen panel, and may be formed by other kinds or types of touchscreen panels.

An adhesive layer 140 adheres the upper sheet 130 and the decoration film 150 to each other.

The decoration film 150 is flexible, and is formed by a PET film, for example. In addition, the decoration film 150 includes a decoration part 151 that is printed with a decoration, and a transparent part 152 having no decoration. The decoration part 151 is provided in a shape of a frame on an outer peripheral of the decoration film 150 so as to surround the transparent part 152. When the touchscreen panel 10 is viewed from above the operation screen, the decoration part 151 conceals the adhesive layer 120, the electrodes and the wiring patterns provided on the upper sheet 130 and the lower substrate 110, the FPC 190, or the like.

An adhesive layer 160 adheres the decoration film 150 and the static-removing film 170 to each other.

The static-removing film 170 and the lead 175 are made of a transparent and flexible base, and may be formed by the PET film 171, for example. The PET film 171 includes a panel part 171*a* laminated on the decoration film 150, a lead 171*b* extending from the panel part 171*a*, and a flexible part 171*c* formed between the panel part 171*a* and the lead 171*b*.

The conductive film 172 is formed on a surface of the PET film 171 closer to or facing the operation screen. The conductive film 172 is formed to span from the panel part 171*a* to the lead 171*b* via the flexible part 171*c*. A conductive film 172*a* formed on the panel part 171*a* and a conductive film 172*b* formed on the lead 171*b* are electrically connected via a conductive film 172*c* formed on the flexible part 171*c*.

The conductive film 172*b* is grounded, as illustrated in FIG. 6. Hence, the operator touches the conductive film 172*a* when the operator operates the touchscreen panel 10, and thus, electrostatic accumulated in the operator can be discharged to the ground through the conductive film 172*b*.

The conductive film 172 may be made of any transparent and conductive material, and may be formed by an ITO film, for example. In addition, the conductive film 172 may be formed by coating and curing a paste, that is made of a resin and including a conductive material mixed and dispersed therein, on the PET film 171. In this case, the resin may be a UV-curing (Ultra-Violet-curing) epoxy acrylate resin, for example, and the conductive material may be a transparent conductive polymer, for example.

The casing 30 that accommodates the touchscreen panel 10 is provided with an opening 31 having a rectangular shape in a plan view. As illustrated in FIG. 6, in the casing 30 that accommodates the touchscreen panel 10, the touchscreen panel 10 is arranged to fit into the opening 31. Hence, no stepped part or a difference in surface levels exists between the operation screen of the touchscreen panel 10 and a top surface 32 of a frame of the casing 30, to form a flush surface. The frame of the casing 30 defines the opening 31.

Figure 7:
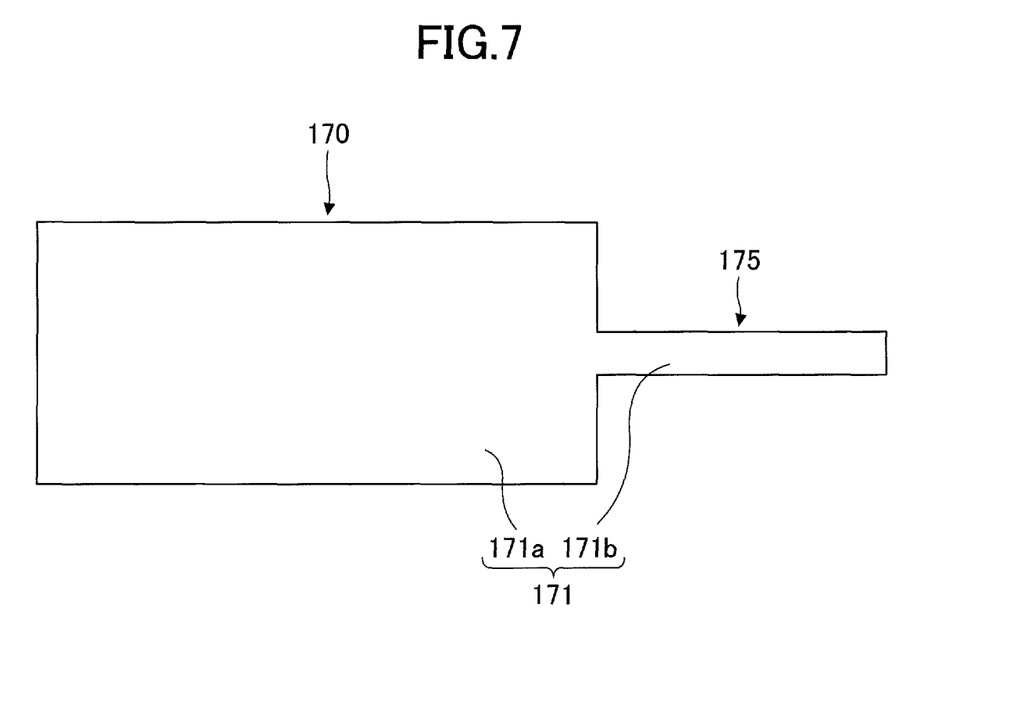
FIG. 7 is a development view illustrating a static-removing film and a lead.

Next, the static-removing film 170 and the lead 175 will further be described, by referring to FIG. 7. FIG. 7 is a development view illustrating the static-removing film 170 and the lead 175.

As illustrated in FIG. 7, the static-removing film 170 and the lead 175 are integrally formed, and the PET film 171 is bent by 90 degrees at a boundary between the panel part 171*a* and the lead 171*b*, that is, by bending the lead 171*b* in a perpendicular direction with respect to the panel part 171*a*. Hence, as illustrated in FIG. 5, a thickness of the static-removing film 170 and a thickness of the lead 175 are approximately the same.

The static-removing film 170 and the lead 175 may be formed by forming the conductive film 172 on the PET film 171 that is cut into a predetermined shape, and bending the lead 175 by 90 degrees so that the surface formed with the conductive film 172 faces the outer side.

Figure 8:
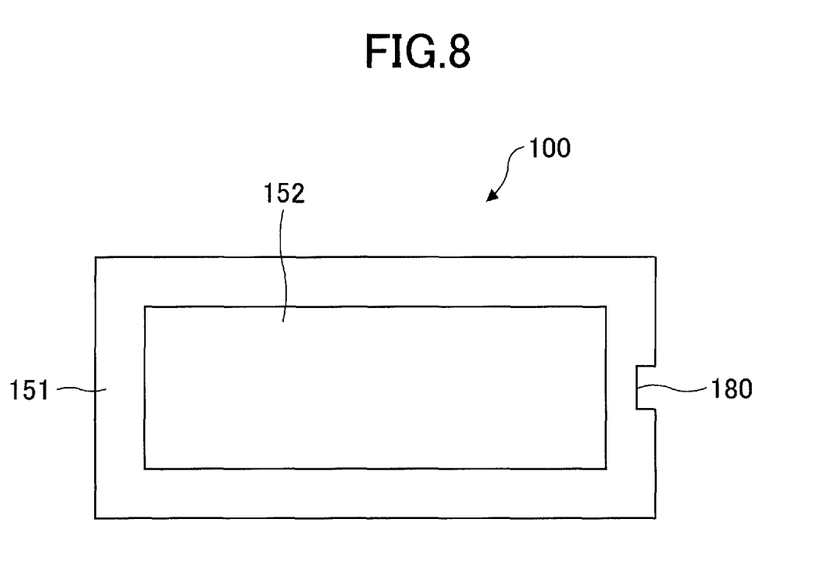
FIG. 8 is a plan view of a main body viewed from an operation screen.
Figure 9:
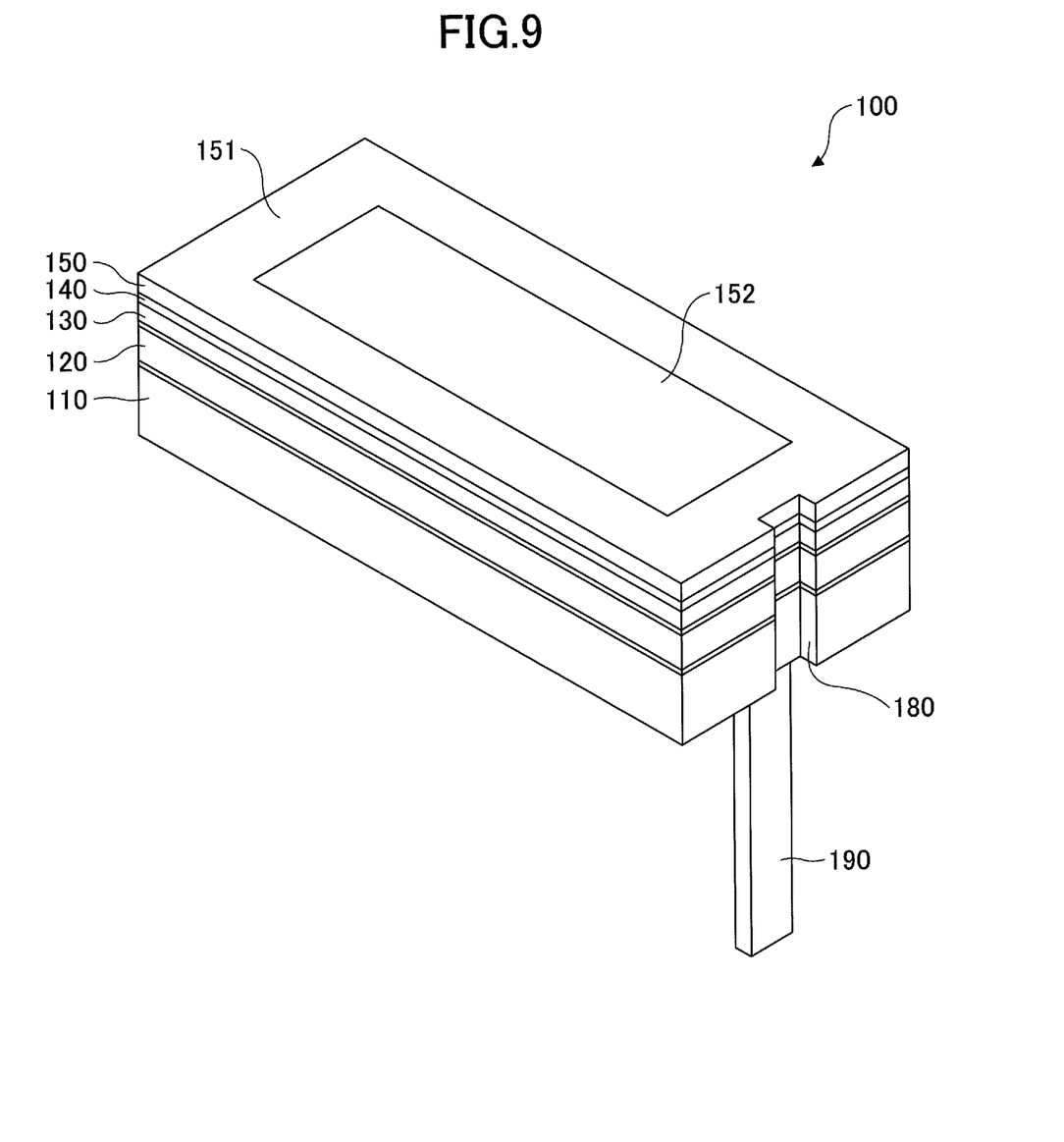
FIG. 9 is a perspective view of the main body.
Figure 10:
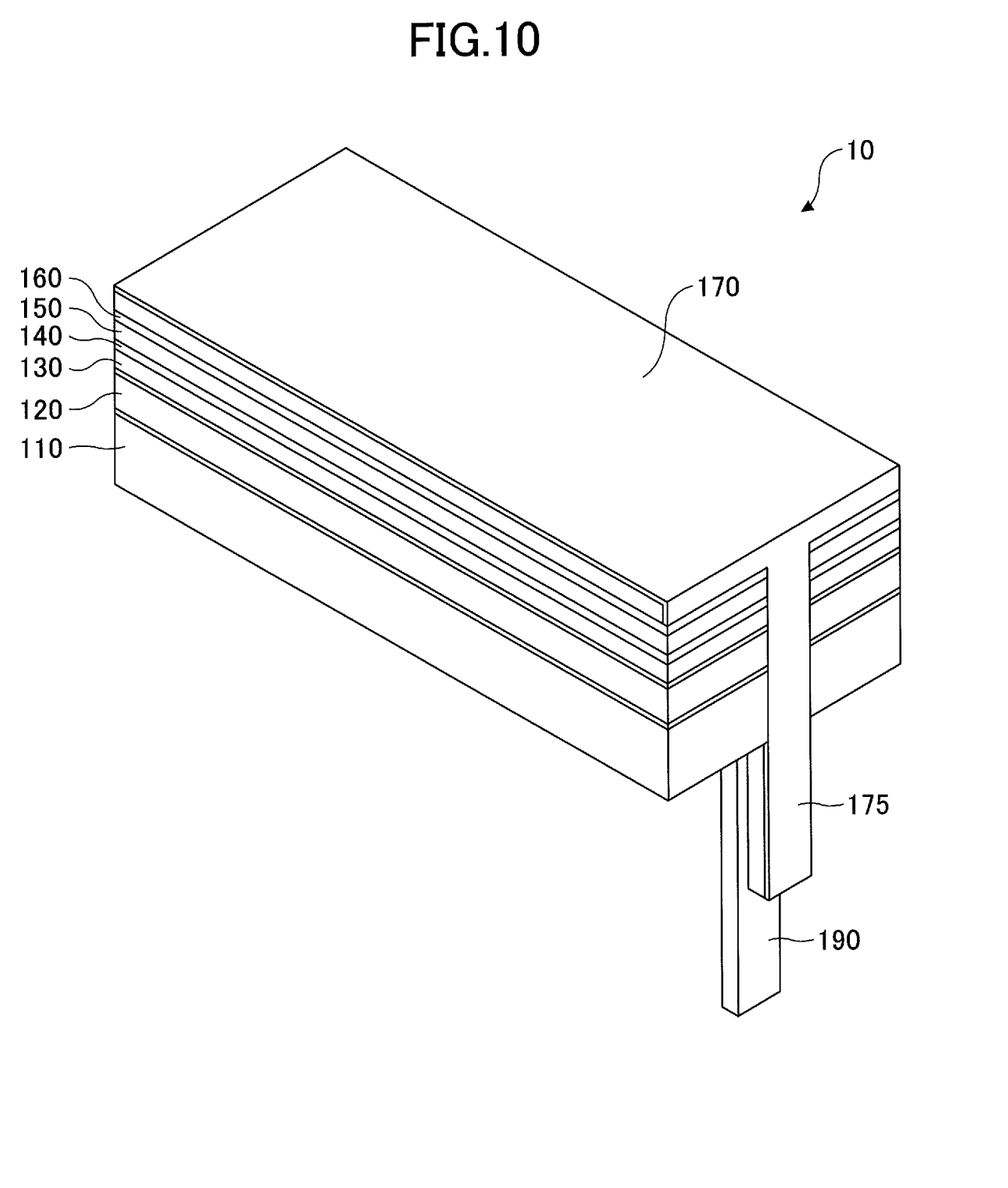
FIG. 10 is a perspective view illustrating the touchscreen panel in one embodiment.

FIG. 8 is a plan view of the main body 100 viewed from the operation screen. FIG. 9 is a perspective view of the main body 100. FIG. 10 is a perspective view illustrating the touchscreen panel 10.

As illustrated in FIG. 8 and FIG. 9, a cutout 180, that is a groove extending in the downward direction, is formed in the main body 100. In addition, as illustrated in FIG. 10, the lead 175 that extends in the downward direction from the static-removing film 170 is arranged in the cutout 180. For this reason, the lead 175 can be arranged so as not to protrude outside from the side surface of the main body 100, and the touchscreen panel 10 can be arranged to fit within the opening 31. Hence, no stepped part or a difference in surface levels exists between the operation screen of the touchscreen panel 10 and the top surface 32 of the frame of the casing 30, to form a flush surface.

According to the touchscreen panel 10 in this embodiment, it is possible to provide a function to remove electrostatics, and simultaneously form the flush surface such that no stepped part or the difference in surface levels exist between the operation screen of the touchscreen panel 10 and the top surface 32 of the frame of the casing 30.

Modifications

Although the touchscreen panel 10 is described above by way of one embodiment, the present invention is not limited to the embodiment, and various variations, modifications, and substitutions may be made without departing from the scope of the present invention.

In the embodiment described above, the touchscreen panel 10 uses, as the base material forming the ITO film, the substrate 111, and the PET film 131. However, both the substrate 111 and the PET film 131 may use the PET film, for example.

In addition, the main body 100 described above is provided with the decoration film 150, the decoration film 150 may be omitted. In a case in which no decoration film 150 is provided, the main body 100 may be formed by a stacked structure including the lower substrate 110 up to the upper sheet 130.

Further, a decoration part can be printed on the upper surface of the PET film 131, so that the upper sheet 130 may function as a decoration film, without using the decoration film 150. Similarly, a decoration part can be printed on the lower surface of the static-removing film 170, so that the static-removing film 170 may function as a decoration film, without using the decoration film 150. In such cases, the decoration can be provided, while simultaneously reducing the number of films that are stacked.

In the touchscreen panel 10 described above, the cutout 180 is provided in the main body 100. However, the touchscreen panel 10 is not limited the structure including the cutout 180 in the main body 100.

Figure 11:
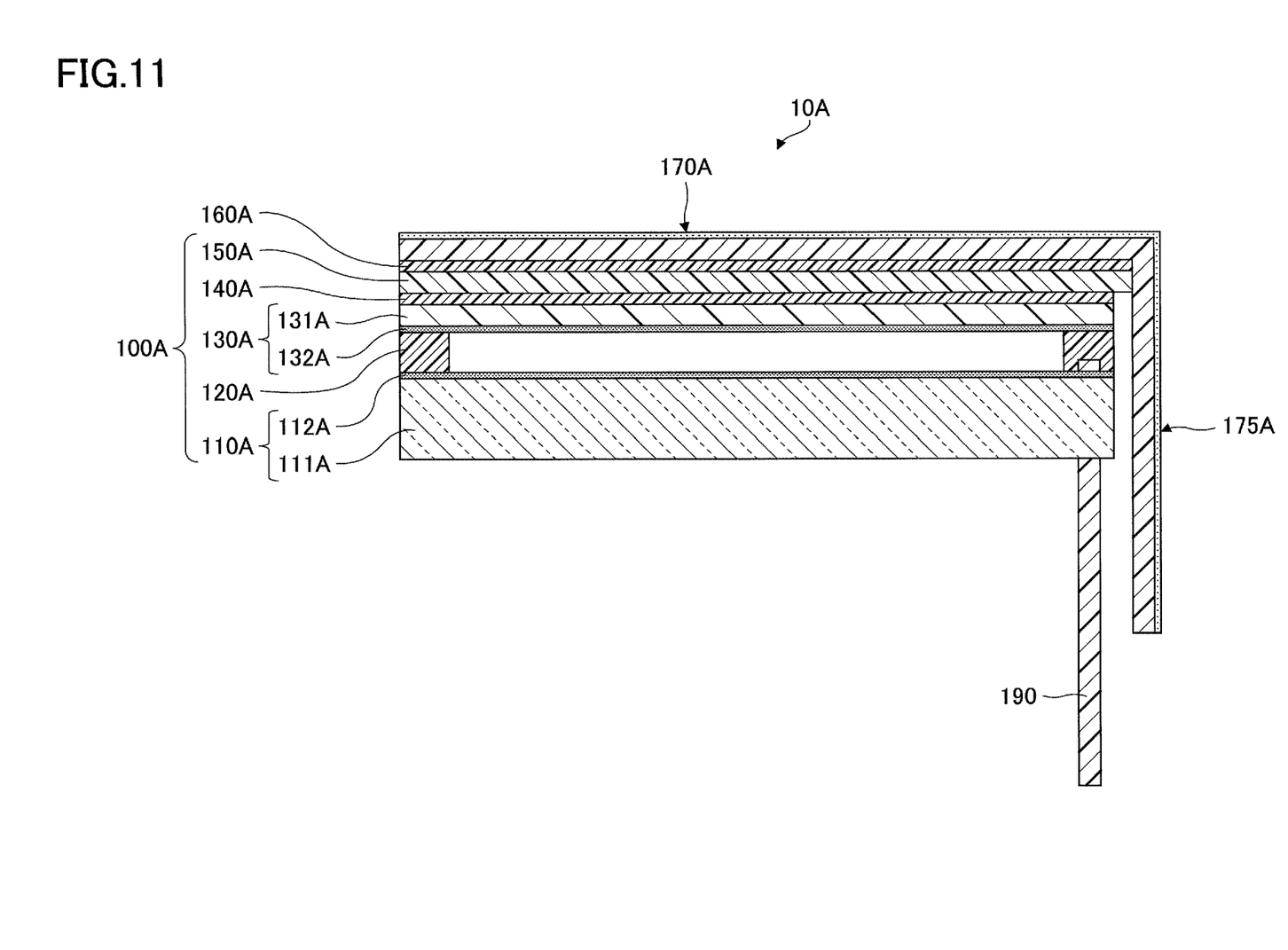
FIG. 11 is a cross sectional view illustrating the touchscreen panel in a first modification.
Figure 12:
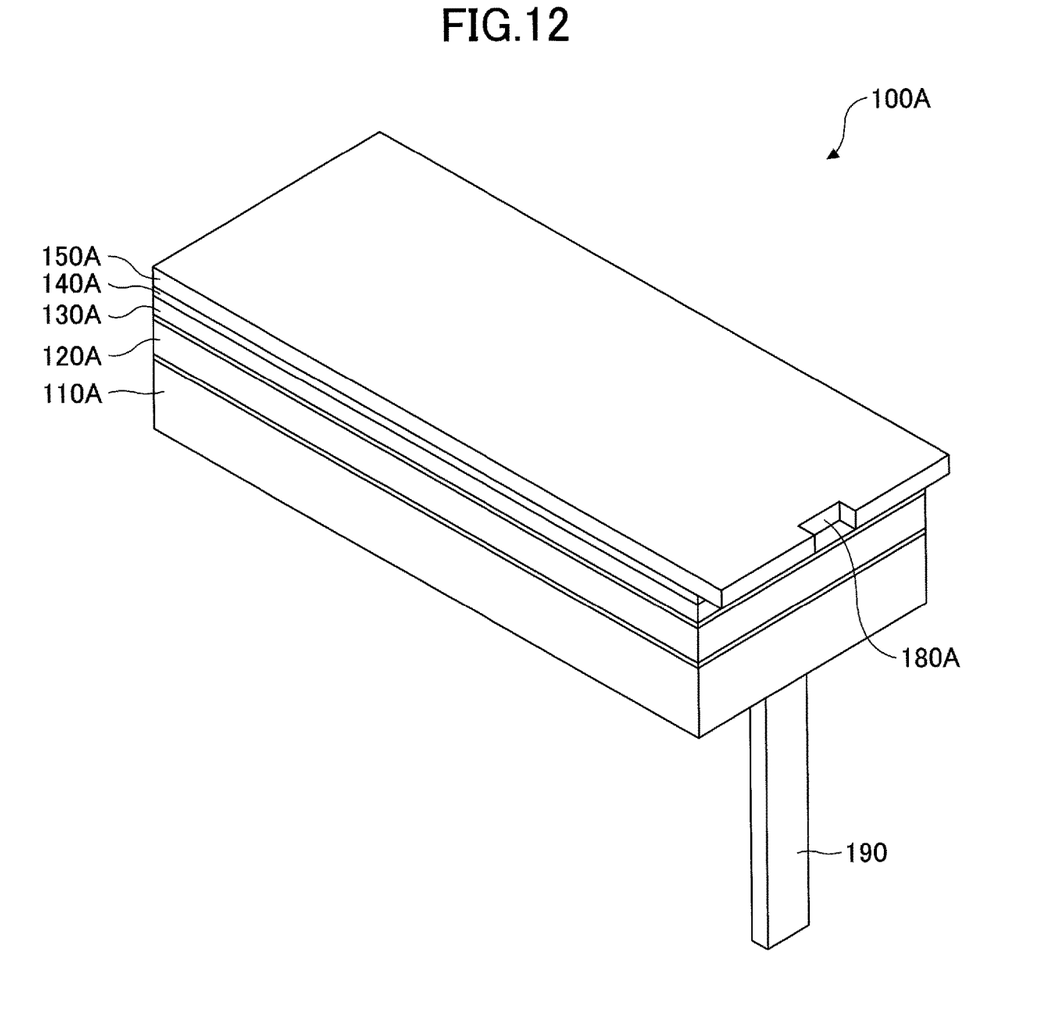
FIG. 12 is a perspective view of the main body in the first modification.

FIG. 11 is a cross sectional view illustrating a touchscreen panel 10A in a first modification. FIG. 12 is a perspective view of a main body 100A of the touchscreen panel 10A.

In a case in which a decoration film 150A is larger than a glass substrate 111A and a PET film 131A, a cutout 180A may be provided only in the decoration film 150A. According to this modification, a lead 175A can also extend in the downward direction in the cutout 180A of the main body 100A. Hence, similarly as in the case of the touchscreen panel 10 described above, it is possible to provide a function to remove electrostatics, and simultaneously form the flush surface such that no stepped part or the difference in surface levels exist between the operation screen and the top surface of the casing.

Figure 13:
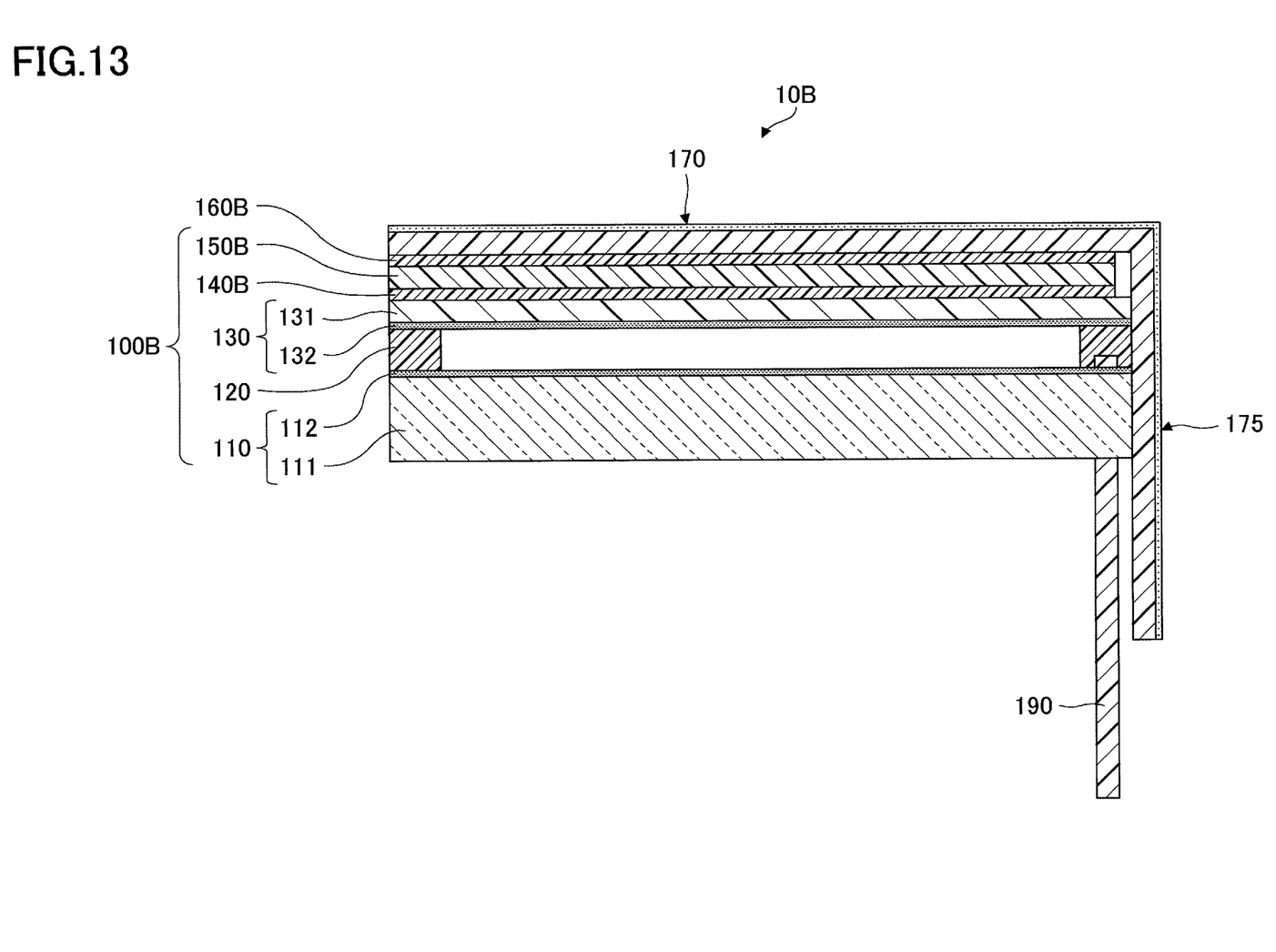
FIG. 13 is a cross sectional view illustrating the touchscreen panel in a second modification.
Figure 14:
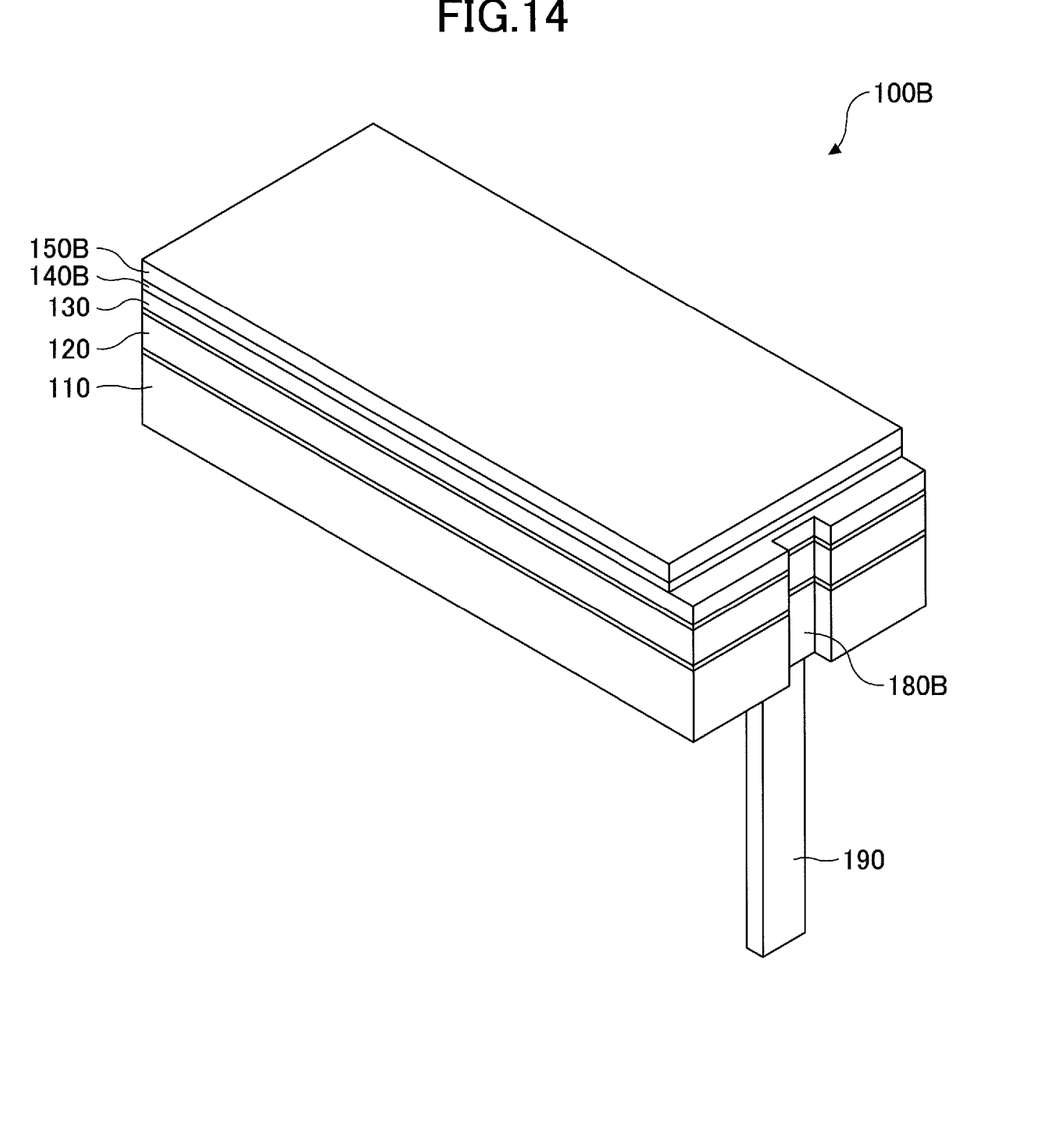
FIG. 14 is a perspective view of the touchscreen panel in the second modification.

FIG. 13 is a cross sectional view illustrating a touchscreen panel 10B in a second modification. FIG. 14 is a perspective view of a main body 100B of the touchscreen panel 10B.

In a case in which a decoration film 150B is smaller than the substrate 111 and the PET film 131, a cutout 180B may be provided in both the substrate 111 and the PET film 131. According to this modification, a lead 175B can also extend in the downward direction in the cutout 180B of the main body 100B. Hence, similarly as in the case of the touchscreen panel 10 described above, it is possible to provide a function to remove electrostatics, and simultaneously form the flush surface such that no stepped part or the difference in surface levels exist between the operation screen of the touchscreen panel 10B and the top surface of the frame of the casing.

According to the embodiments and modifications described above, it is possible to provide a touchscreen panel having a function to remove electrostatics, and a flush surface such that no stepped part or a difference in surface levels exist between a casing and an operation screen.

The casing, and the touchscreen panel accommodated within the casing, may form a display apparatus.

Although the modifications are numbered with, for example, "first," and "second," the ordinal numbers do not imply priorities of the modifications.

Further, the present invention is not limited to these embodiments, but various variations and modifications may be made without departing from the scope of the present invention.

What is claimed is:

1. A touchscreen panel comprising:
a main body including a lower substrate that includes a first transparent conductive film, and an upper sheet that includes a second transparent conductive film;
a transparent static-removing film, arranged on the main body, and including a conductive film; and
a transparent lead including a conductive part electrically connected to the conductive film,
wherein the transparent static-removing film and the transparent lead are integrally formed,
wherein the main body includes a cutout in which the transparent lead is arranged so as not to protrude outside from a side surface of the main body, and
wherein the transparent lead is formed by a bent portion of the transparent static-removing film extending from one side of the transparent static-removing film.

2. The touchscreen panel as claimed in claim 1, further comprising:
a flexible part, provided between the transparent static-removing film and the transparent lead, bending the transparent lead in a vertical direction to the transparent static-removing film.

3. The touchscreen panel as claimed in claim 1, wherein the transparent lead extends from the transparent static-removing film in a direction towards the lower substrate.

4. The touchscreen panel as claimed in claim 1, further comprising:
a decoration film provided on the second transparent conductive film,
wherein the cutout is formed in at least the decoration film.

5. The touchscreen panel as claimed in claim 4, wherein the cutout is formed in the lower substrate and the upper sheet.

6. A display apparatus comprising:
a touchscreen panel according to claim 1, and including an operation screen; and
a casing, having a frame that defines an opening thereof, and configured to accommodate the touchscreen panel arranged to fit into the opening,
wherein the operation screen of the touchscreen panel and a top surface of the frame form a flush surface.

7. The touchscreen panel as claimed in claim 1, wherein a surface of the transparent static-removing film, opposite from the main body, forms an operation screen of the touchscreen panel.

8. The touchscreen panel as claimed in claim 1, wherein the transparent static-removing film and the transparent lead have the same thickness.

9. The touchscreen panel as claimed in claim 1, wherein the transparent static-removing film further includes a poly-ethylene terephthalate film arranged on the main body, and the conductive film is formed on the poly-ethylene terephthalate film.

10. The touchscreen panel as claimed in claim 1, wherein
the lower substrate includes a glass substrate, and a first indium tin oxide film formed on an upper surface of the glass substrate, and
the upper sheet includes a first poly-ethylene terephthalate film, and a second indium tin oxide film formed on a lower surface of the first poly-ethylene terephthalate film.

11. The touchscreen panel as claimed in claim 10, wherein the transparent static-removing film further includes a second poly-ethylene terephthalate film arranged on the upper sheet, and the conductive film is formed on the second poly-ethylene terephthalate film.

* * * * *